(12) United States Patent
Kido et al.

(10) Patent No.: US 10,107,491 B2
(45) Date of Patent: Oct. 23, 2018

(54) INJECTION DEVICE AND STEAM TURBINE SYSTEM

(71) Applicant: MITSUBISHI HITACHI POWER SYSTEMS, LTD., Kanagawa (JP)

(72) Inventors: Haruka Kido, Yokohama (JP); Akihiro Hamasaki, Yokohama (JP); Takashi Michino, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 94 days.

(21) Appl. No.: 15/127,639

(22) PCT Filed: Jan. 21, 2015

(86) PCT No.: PCT/JP2015/051513
§ 371 (c)(1),
(2) Date: Sep. 20, 2016

(87) PCT Pub. No.: WO2015/146249
PCT Pub. Date: Oct. 1, 2015

(65) Prior Publication Data
US 2017/0130955 A1 May 11, 2017

(30) Foreign Application Priority Data
Mar. 28, 2014 (JP) ................................. 2014-070273

(51) Int. Cl.
*F22B 37/02* (2006.01)
*F22B 37/52* (2006.01)
(Continued)

(52) U.S. Cl.
CPC ............... *F22B 37/025* (2013.01); *B01J 4/00* (2013.01); *C02F 1/66* (2013.01); *C02F 1/686* (2013.01);
(Continued)

(58) Field of Classification Search
CPC .......... B01D 19/00; B01J 4/00; F22B 37/025; F22B 37/56; F22B 37/52; C23F 11/08;
(Continued)

(56) References Cited

U.S. PATENT DOCUMENTS 3,428,557 A * 2/1969 Rivers ..................... C02F 1/686
137/11
6,655,322 B1 * 12/2003 Godwin ................ F22B 37/565
122/379
(Continued)

FOREIGN PATENT DOCUMENTS

CN 201775480 3/2011
CN 102311177 1/2012
(Continued)

OTHER PUBLICATIONS

McIlvaine Company, "Power Plant Pumps," Aug. 30, 2012, www.mcilvainecompany.com.*
(Continued)

*Primary Examiner* — Mark Laurenzi
*Assistant Examiner* — Xiaoting Hu
(74) *Attorney, Agent, or Firm* — Wenderoth, Lind & Ponack, L.L.P.

(57) ABSTRACT

An injection device for injecting injection fluid (chemicals) into piping through which fluid flows, the injection device comprising: an injection line through which the injection fluid flows, the injection line being connected to the piping; an injection pump disposed on the injection line; an extrusion line connected downstream of the injection pump and upstream of a target portion for air removal on the injection line; and an extrusion pump for feeding extrusion fluid to the extrusion line, wherein a discharge capacity of the extrusion pump is greater than a discharge capacity of the injection pump.

6 Claims, 3 Drawing Sheets

(51) Int. Cl.
*C23F 11/08* (2006.01)
*C02F 1/68* (2006.01)
*F01K 9/00* (2006.01)
*B01J 4/00* (2006.01)
*C02F 1/66* (2006.01)
*F01K 7/16* (2006.01)
*C02F 103/02* (2006.01)

(52) U.S. Cl.
CPC ............... *C23F 11/08* (2013.01); *F01K 7/16* (2013.01); *F01K 9/00* (2013.01); *F22B 37/52* (2013.01); *C02F 2103/02* (2013.01); *C02F 2103/023* (2013.01)

(58) Field of Classification Search
CPC .... C02F 1/00; C02F 1/66; C02F 1/686; F01K 9/00
See application file for complete search history.

(56) References Cited

U.S. PATENT DOCUMENTS

| | | | |
|---|---|---|---|
| 2009/0183694 A1 | 7/2009 | Remark et al. | |
| 2010/0163399 A1* | 7/2010 | Ishihara | C02F 1/008 203/7 |
| 2011/0083561 A1 | 4/2011 | Douma et al. | |

FOREIGN PATENT DOCUMENTS

| | | | |
|---|---|---|---|
| CN | 103635435 | | 3/2014 |
| JP | 07-110106 | | 4/1995 |
| JP | 07110106 | A * | 4/1995 |
| JP | 10-169905 | | 6/1998 |
| JP | 11-030403 | | 2/1999 |
| JP | 11-141804 | | 5/1999 |
| JP | 11-210410 | | 8/1999 |
| JP | 2002-277192 | | 9/2002 |
| JP | 2003-080004 | | 3/2003 |
| JP | 2005-214546 | | 8/2005 |
| JP | 2007-209864 | | 8/2007 |
| JP | 2007-292414 | | 11/2007 |
| JP | 2010-266131 | | 11/2010 |

OTHER PUBLICATIONS

First Office Action dated Feb. 27, 2017 in corresponding Chinese Application No. 2015800137755, with English translation.
International Search Report dated Apr. 21, 2015 in International Application No. PCT/JP2015/051513 (with English translation).
Written Opinion of the International Searching Authority dated Apr. 21, 2015 in International Application No. PCT/JP2015/051513 (with English translation).
Chen Shui-ping et al., "Transformation of the Boiler Feed Water Automatic Dosing", The power-saving technology, vol. 2, pp. 74-75, Jun. 25, 2010, with English abstract.

* cited by examiner

INJECTION DEVICE AND STEAM TURBINE SYSTEM

TECHNICAL FIELD

The present invention relates to an injection device for injecting injection fluid into piping through which fluid flows, and a steam turbine system including the same.

This application claims priority based on Japanese Patent Application No. 2014-070273 filed in Japan on Mar. 28, 2014, of which the contents are incorporated herein by reference.

BACKGROUND ART

In steam turbine systems, piping configuring feedwater and condensate systems is typically made of carbon steel or copper. However, the rate of corrosion is higher in carbon steel at lower pH (acidic) and in copper at higher pH (alkaline). Thus, to prevent corrosion in the feedwater and condensate systems, for example, the water properties must be adjusted to a pH of approximately 9.2 (weak alkalinity) by injecting chemicals into the feedwater flowing through the feedwater system. Specifically, ammonia ($NH_3$) or hydrazine ($N_2H_4$) are added to adjust the pH. Furthermore, hydrazine can be added to remove dissolved oxygen in the feedwater which is also a cause of corrosion.

However, due to various factors, air may remain in chemical injection piping for injecting the chemicals into the piping of the feedwater system. When the chemicals are injected into the piping of the feedwater system, the air remaining in the chemical injection piping acts like a damper and can prevent the chemicals from being sufficiently injected. Thus, there is a demand for technology for removing such remaining air.

Examples of such technology include the chemical injection device of Patent Document 1. The chemical injection device of Patent Document 1 includes piping through which main fluid (water) flows, a chemical injection flow path through which the chemicals injected into the piping flows, a main fluid flow meter that detects the flow rate of the main fluid and emits a flow rate signal, a high flow rate pump with a large discharge capacity, a low flow rate pump with a small discharge capacity, and a control unit configured to receive the flow rate signal emitted from the main fluid flow meter and send a flow rate signal to the two pumps. This chemical injection device injects chemicals into the main fluid, switching between the two pumps depending upon whether the main fluid flow rate is high or low.

Additionally, this chemical injection device includes a return flow path for removing air. The return flow path extends from a halfway point of the chemical supply flow path, on which the high flow rate pump and the low flow rate pump are disposed, and returns to a chemical tank that stores the chemicals. This return flow path completes a circulation path connecting one of the pumps and the chemical tank to each other. In other words, the chemical injection device removes air in the flow path by circulating the chemicals in the circulation path, prior to switching between the two pumps.

CITATION LIST

Patent Document

Patent Document 1: Japanese Unexamined Patent Application Publication No. 2007-209864A

SUMMARY OF INVENTION

Technical Problem

Actual steam turbine systems have constraints in terms of installation space and design leading to the possibility that rising portions are formed in the piping. A rising portion refers to piping, disposed conforming to the plane in which the steam turbine system is installed, that veers from this installation plane and runs upward, extends parallel to the installation plane, and then returns to run conforming to the installation plane. Such configurations are susceptible to air remaining in these rising portions.

The chemical injection piping of the conventional technology described above, when formed with such rising portions, is susceptible to air remaining in these rising portions. The chemical injection device described in Patent Document 1 is unable to sufficiently remove air in the cases where air remains in the piping.

An object of the present invention is to provide an injection device capable of sufficiently removing air remaining in piping.

Solution to Problem

A first aspect of the present invention is an injection device for injecting injection fluid into piping through which fluid flows, the injection device including:
an injection line through which the injection fluid flows, the injection line being connected to the piping;
an injection pump disposed on the injection line;
an extrusion line connected downstream of the injection pump and upstream of a target portion for air removal on the injection line; and
an extrusion pump for feeding extrusion fluid to the extrusion line. A discharge capacity of the extrusion pump is greater than a discharge capacity of the injection pump.

According to the configuration described above, the extrusion pump and the extrusion line connected to the extrusion pump are disposed upstream of the target portion for air removal. Moreover, the extrusion pump has a greater discharge capacity than that of the injection pump. Thus, the air in the target portion for air removal can be sufficiently removed.

A second aspect of the present invention is the injection device according to the first aspect, wherein
a water pump for feeding fluid is disposed on the piping,
the extrusion line is connected downstream of the water pump disposed on the piping, and
the water pump also serves as the extrusion pump.

According to the configuration described above, a feedwater pump for feeding fluid to the piping can also serve as the extrusion pump. Thus, an additional pump is not necessary, and air can be removed from the target portion for air removal with just a simple modification to an existing system.

A third aspect of the present invention is the injection device according to the first aspect, further including:
a cleaning line for passing cleaning fluid to the injection line; and
a cleaning pump for feeding cleaning fluid to the cleaning line, wherein
the cleaning line constitutes a portion of the extrusion line and is connected downstream of the injection pump and upstream of the target portion for air removal on the injection line, and the cleaning pump also serves as the extrusion pump.

According to the configuration described above, the cleaning pump for feeding cleaning fluid to the cleaning line can also serve as the extrusion pump. Thus, an additional pump is not necessary, and air can be removed from the target portion for air removal with just a simple modification to an existing system.

A fourth aspect of the present invention is a steam turbine system including:
the injection device according to any one of the aspects described above;
a boiler that generates steam;
a steam turbine that is driven by the steam;
a condenser that condenses the steam exhausted from the steam turbine to water;
a feedwater line for passing the water generated at the condenser to the boiler; and
a feedwater pump disposed on the feedwater line. In addition, the feedwater line is the piping.

Thus, a steam turbine system with the configuration described above capable of maintaining the properties of water in a feedwater line in a suitable state can be provided.

Advantageous Effects of Invention

The injection device described above can suitably remove the air from inside the piping. Additionally, the properties of water in a feedwater line of a steam turbine system can be maintained in a suitable state.

DESCRIPTION OF EMBODIMENT

Embodiment

Hereinafter, an injection device 1 according to an embodiment of the present invention will be described with reference to the drawings.

Figure 1:
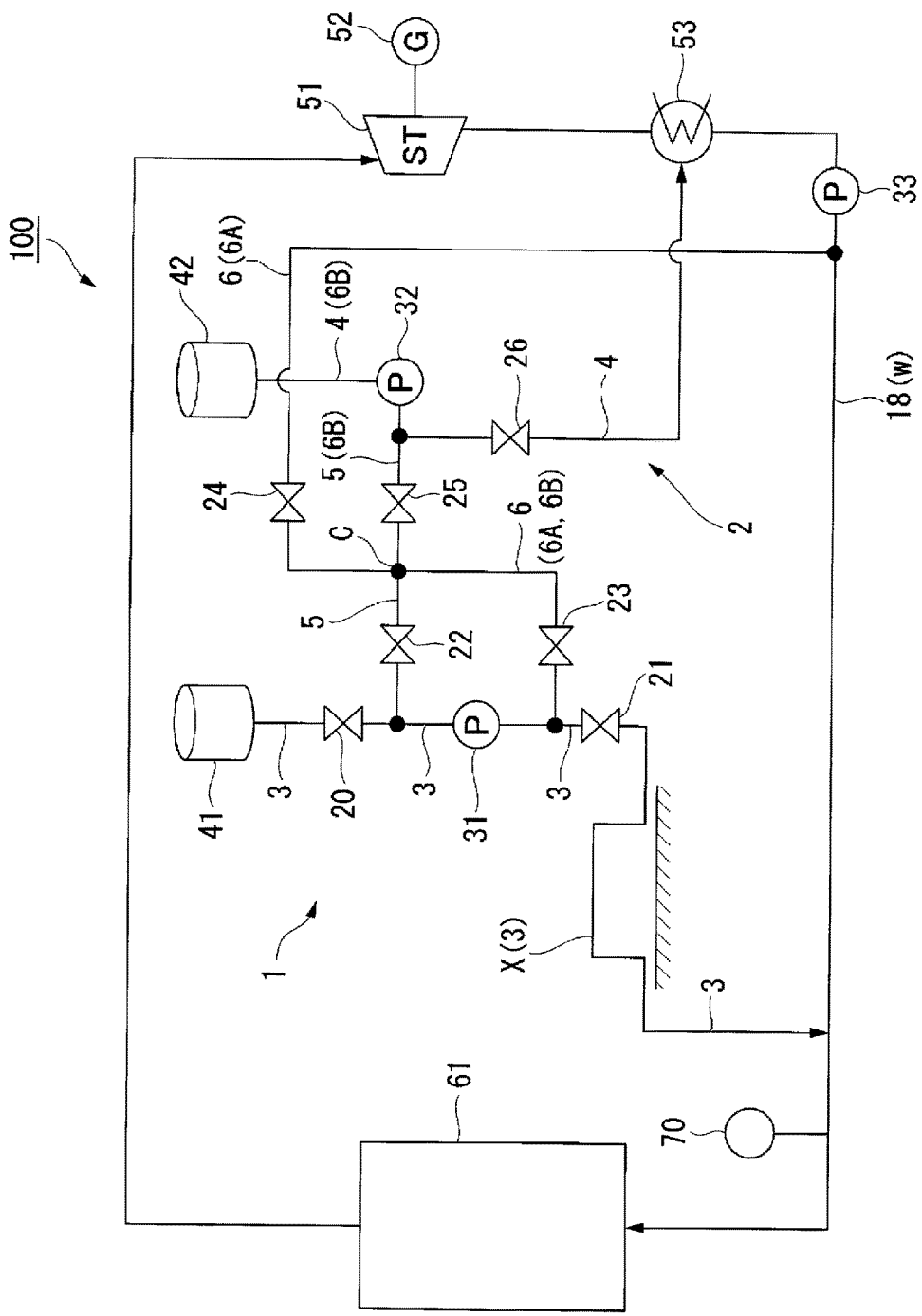
FIG. 1 is a system diagram of a steam turbine system including an injection device according to an embodiment of the present invention.

As illustrated in FIG. 1, a steam turbine system 100 includes a boiler 61, a steam turbine 51, an external device 52 connected to the steam turbine 51, a condenser 53, a feedwater pump 33, the injection device 1, and a supply device 2.

The boiler 61 generates steam, which is sent to the steam turbine 51. The steam turbine 51 is driven by steam generated by the boiler 61. The external device 52 is a generator or the like connected to the steam turbine 51. The external device 52 is driven by the output from the steam turbine 51. The condenser 53 is provided to condense the steam exhausted from the steam turbine 51. The condenser 53 and the boiler 61 are connected by a feedwater line 18 (piping 18). The feedwater line 18 serves as a feedwater system W of the steam turbine system 100.

Additionally, the feedwater pump 33 is disposed on the feedwater line 18. The feedwater pump 33 supplies water (fluid) as feedwater. The feedwater pump 33 supplies water from the condenser 53 to the boiler 61. The feedwater pump 33 serves as a water pump of the steam turbine system 100.

The injection device 1 is provided to supply chemicals to suppress corrosion of the piping of the steam turbine system 100. The supply device 2 is provided to supply water to the feedwater system W.

The injection device 1 includes a chemical tank 41 for storing the chemicals (injection fluid), an injection line 3 for injecting the chemicals supplied from the chemical tank 41 into the feedwater line 18, and an injection pump 31 for injecting the chemicals, the injection pump 31 being disposed on the injection line 3. The injection pump 31 is a diaphragm pump, which is a type of metering pump. Note that the discharge capacity of the feedwater pump 33 described above is greater than the discharge capacity of the injection pump 31.

On the injection line 3 in order from the chemical tank 41 toward the feedwater line 18, a first injection valve 20, the injection pump 31, and a second injection valve 21 are disposed. Note that in the following description, the side of the injection line 3 toward the chemical tank 41 corresponds to upstream and the side toward the feedwater line 18 corresponds to downstream.

A rising portion X is disposed downstream of the second injection valve 21 on the injection line 3. The rising portion X is piping formed by necessity due to constraints in terms of installation space and design placed on the steam turbine system 100.

The rising portion X is a portion of the injection line 3, which is disposed conforming to the plane in which the steam turbine system 100 is installed, configured in a manner that veers from this installation plane and runs upward, extends substantially parallel to the installation plane, and then returns to run conforming to the installation plane. Air is more likely to remain inside the rising portion X than other portions on the injection line 3 disposed conforming to the installation plane. This remaining air acts like a damper on the flow of chemicals injected inside the injection line 3.

Thus, when the steam turbine system 100 operates, to remove such air, air removal is necessary. In other words, the rising portion X is the target portion for air removal.

The supply device 2 includes a makeup tank 42 for storing water as makeup water, a makeup line 4 for introducing this water into the condenser 53, and a makeup pump 32 (also serving as a cleaning pump described below), disposed on the makeup line 4, that supplies water.

On the makeup line 4 in order from the makeup tank 42 toward the condenser 53, the makeup pump 32 and a makeup valve 26 are disposed. Note that in the following description, the side of the makeup line 4 toward the makeup tank 42 corresponds to upstream and the side toward the condenser 53 corresponds to downstream.

The injection line 3 at the side upstream of the injection pump 31 is connected to the makeup line 4 at the side downstream of the makeup pump 32 by a cleaning line 5. On the cleaning line 5 in order from the injection line 3, a first cleaning valve 22 and a second cleaning valve 25 are disposed.

The feedwater line 18 at the side downstream of the feedwater pump 33 is connected to the injection line 3 at the side downstream of the injection pump 31 by an extrusion line 6 via a connection portion C disposed between the first cleaning valve 22 and the second cleaning valve 25. On the extrusion line 6 in order from the injection line 3 toward the feedwater line 18, a first extrusion valve 23 and a second extrusion valve 24 are disposed.

Water supplied from the makeup tank 42 described above flows through the cleaning line 5. Accordingly, by opening the first cleaning valve 22 and the second cleaning valve 25 and closing the first extrusion valve 23 and the makeup valve 26, the injection line 3 and the injection pump 31 are cleaned by the water. Note that the makeup pump 32 is driven to introduce cleaning water through the cleaning line 5. In other words, the makeup pump 32 also serves as a cleaning pump.

Next, operations of the injection device 1 and the steam turbine system 100 with the configuration described above will be described.

The steam turbine system 100 operates as described below when in normal operation. First, the steam generated by the boiler 61 is supplied to the steam turbine 51. The steam turbine 51 is driven in rotation by the supplied steam, thus driving the connected external device 52.

Next, the steam exhausted from the steam turbine 51 is fed to the condenser 53. At the condenser 53, the steam undergoes heat exchange and condenses to water. As feedwater, this water is supplied to the boiler 61 by the feedwater pump 33 disposed on the feedwater line 18. At the boiler 61, the water is heated to generate steam. In such a manner, during operation of the steam turbine system 100, water flows from the condenser 53 to the boiler 61 through the feedwater line 18.

Here, the piping of the steam turbine system 100 is mainly formed of carbon steel, and thus a device to prevent corrosion due to water is desired. The injection device 1 that injects the chemicals functions as such a device. The chemicals mainly used to adjust the pH of the water are hydrazine or ammonia. The feedwater flowing through the inside of the feedwater line 18 is maintained at a weak alkalinity by such chemicals.

The operation of the injection device 1 and the supply device 2 will be described below.

The chemical tank 41 of the injection device 1 stores the chemicals, such as hydrazine and ammonia described above. The chemicals supplied from the chemical tank 41 are injected into the feedwater line 18 upstream of the boiler 61 via the injection line 3. Adjusting the pH of the feedwater by injecting the chemicals in this manner allows the corrosion of the feedwater line 18 to be prevented.

On the feedwater line 18, a measuring device 70 is disposed. The measuring device 70 measures the concentration of the chemicals in the water flowing through the feedwater line 18. In the injection device 1, the first injection valve 20 and the second injection valve 21 are opened and closed and the injection pump 31 is driven depending on the concentration. Thus, chemicals are injected even while the steam turbine system 100 is in operation.

Furthermore, water (feedwater) flowing through the feedwater line 18 is required to be appropriately supplied upon continuous operation of the steam turbine system 100. The supply device 2 is used to supply water.

Water is stored as makeup water in the makeup tank 42 of the supply device 2. In the present embodiment, the water in the makeup tank 42 is supplied to the condenser 53 through the makeup line 4. For the supply device 2 to supply water, the second cleaning valve 25 is closed, the makeup valve 26 is opened, and the makeup pump 32 is driven.

Here, as described above, the rising portion X is disposed on the injection line 3 at the side downstream of the second injection valve 21. The operation of the injection device 1 for removing air remaining inside the rising portion X will be described with reference to FIG. 2 and FIG. 3.

The air is removed by feeding a relatively large volume of water through the target portion for air removal (rising portion X). To feed water through the rising portion X, either an extrusion system A that utilizes water (feedwater) flowing through the feedwater line 18 or an extrusion system B that utilizes water (makeup water) stored in the makeup tank 42 is used.

Figure 2:
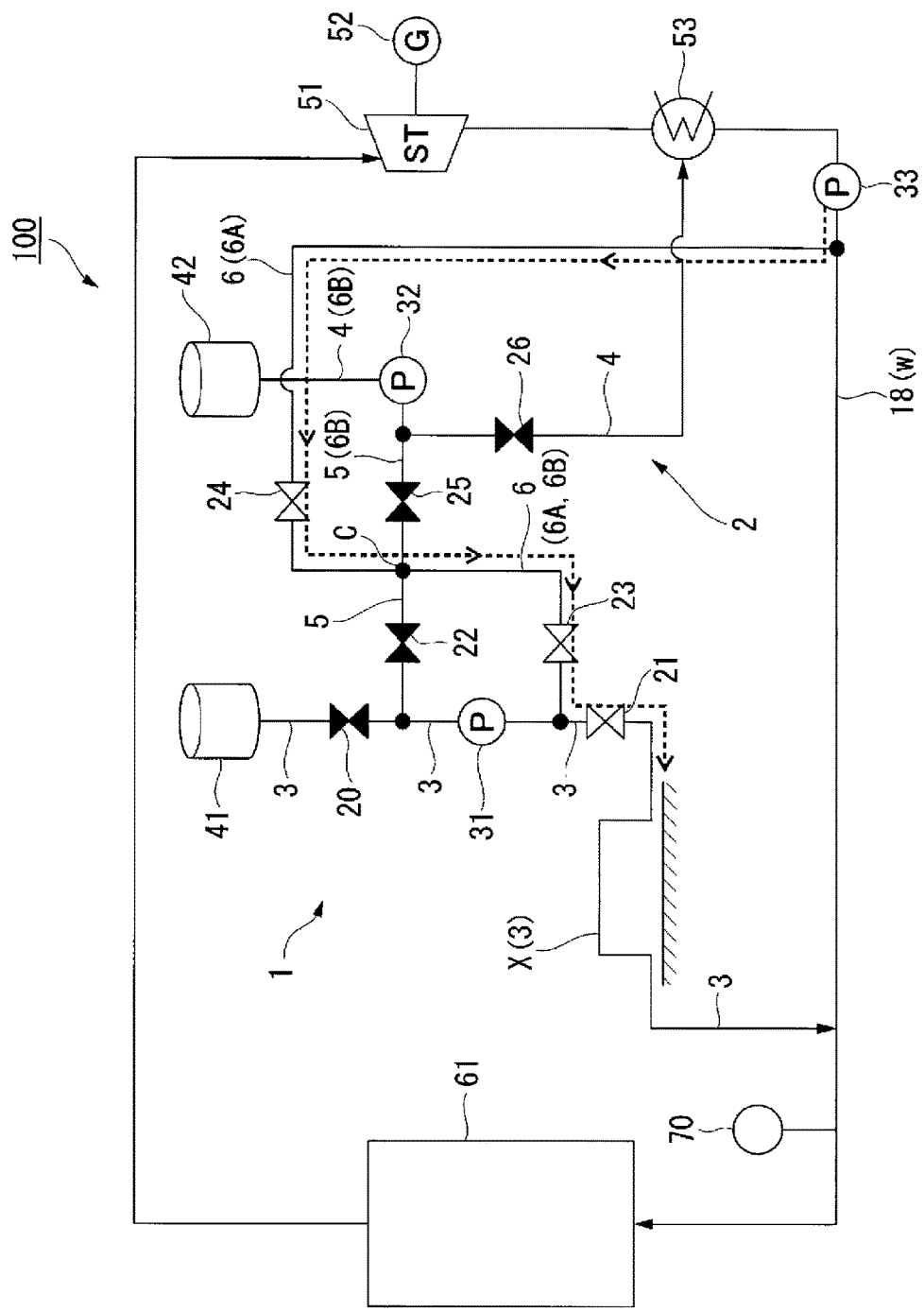
FIG. 2 is a diagram for explaining the operation of the injection device according to the embodiment of the present invention.

The extrusion system A, which removes air using water flowing through the feedwater line 18, will be described with reference to FIG. 2. In the following description, the extrusion line 6 is referred to as A extrusion line 6A.

To utilize the feedwater flowing through the feedwater line 18, the first extrusion valve 23 and the second extrusion valve 24 on the A extrusion line 6A, and the second injection valve 21 on the injection line 3 are opened. The other valves, i.e. the first injection valve 20, the first cleaning valve 22, the second cleaning valve 25, and the makeup valve 26, are closed. Accordingly, the feedwater line 18 and the rising portion X come into communication via the A extrusion line 6A and the injection line 3.

In such a state, the feedwater pump 33 is driven as a first extrusion pump. Some of the water flowing through the feedwater line 18 is passed through the A extrusion line 6A and the injection line 3 and then through the rising portion X of the injection line 3. As a result, the remaining air is pushed out from the rising portion X. The feedwater pump 33 has a discharge capacity (flow rate) sufficient to push out the remaining air from the rising portion X. Accordingly, as illustrated in FIG. 2, the feedwater line 18 at the side downstream of the feedwater pump 33 communicates with the rising portion X via the A extrusion line 6A and the injection line 3, and the water discharged from the feedwater pump 33 flows through the rising portion X. As a result, the remaining air can be pushed out from the rising portion X. The air pushed out from the rising portion X flows from the injection line 3 to the feedwater line 18 and then to the boiler 61.

Figure 3:
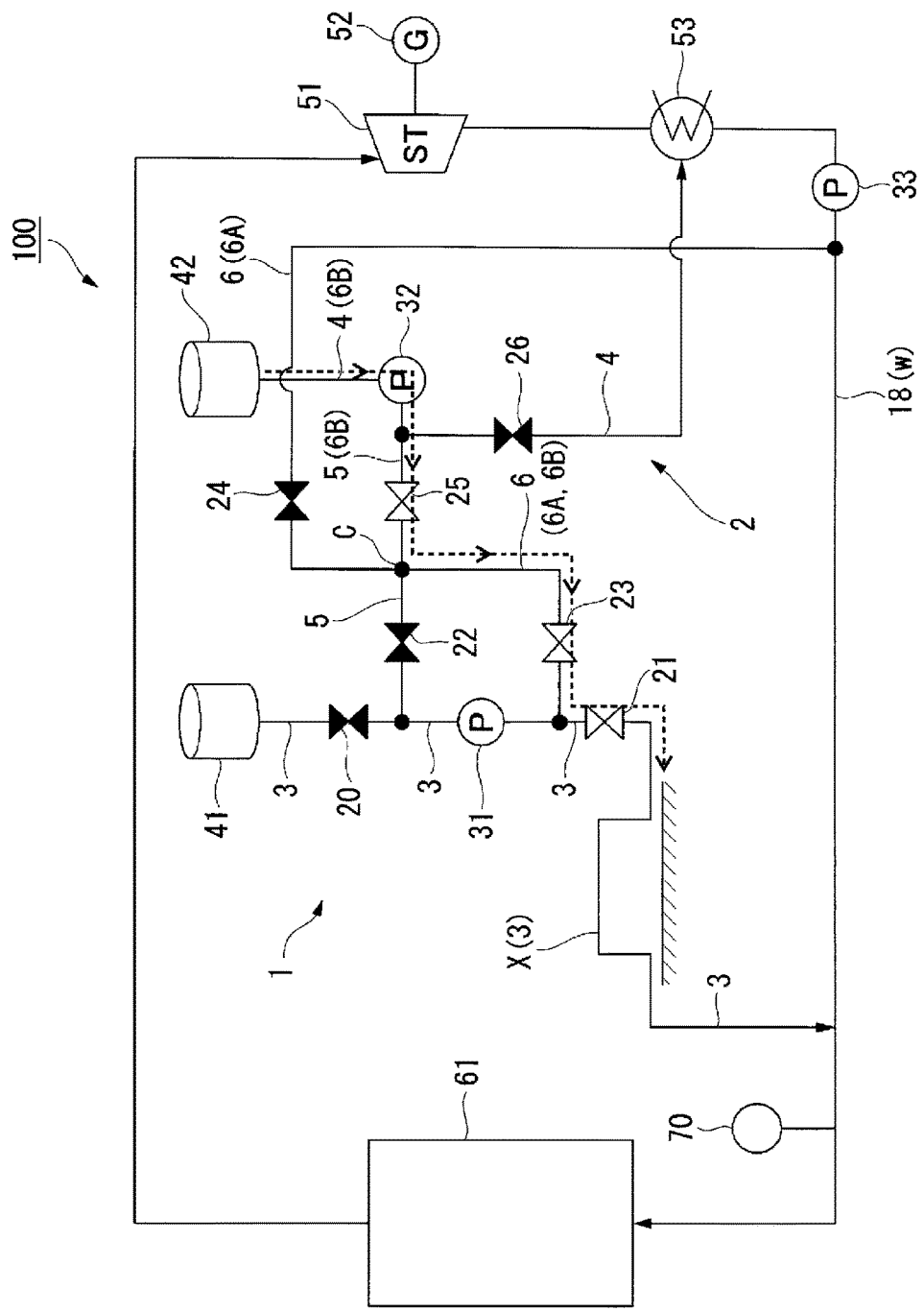
FIG. 3 is a diagram for explaining the operation of the injection device according to the embodiment of the present invention.

Next, the extrusion system B, which uses the water stored in the makeup tank 42, will be described with reference to FIG. 3. In the following description, the route formed of the makeup line 4, a portion of the cleaning line 5, and a portion of the extrusion line 6 is referred to as B extrusion line 6B.

Specifically, the B extrusion line 6B includes the portion of the cleaning line 5 from the makeup pump 32 to the connection portion C and the portion of the extrusion line 6 from the connection portion C to the injection line 3.

For the B extrusion line 6B to utilize the water stored in the makeup tank 42, first the second cleaning valve 25 and the first extrusion valve 23 are opened. In addition, the second injection valve 21 on the injection line 3 is opened. The valves other than those mentioned above, that is, the first injection valve 20, the first cleaning valve 22, the second extrusion valve 24, and the makeup valve 26 are closed. Accordingly, the makeup tank 42 and the rising portion X come into communication via the B extrusion line 6B and the injection line 3.

In such a configuration, the makeup pump 32 is driven as a second extrusion pump. Then, the water supplied from the makeup tank 42 flows through the B extrusion line 6B described above and the injection line 3 and then through the rising portion X on the injection line 3. As a result, the remaining air is pushed out from the rising portion X. The makeup pump 32 has a discharge capacity (flow rate) sufficient to push out the remaining air from the rising portion X in a similar manner to that of the feedwater pump 33. Accordingly, as illustrated in FIG. 3, the makeup tank 42 communicates with the rising portion X via the B extrusion line 6B and the injection line 3, and the water discharged from the makeup pump 32 flows through the rising portion X. As a result, the remaining air can be pushed out from the rising portion X. The air pushed out from the rising portion X flows from the injection line 3 to the feedwater line 18 and then to the boiler 61.

As described above, in the injection device 1 according to the present embodiment, the feedwater pump 33, i.e. the first extrusion pump, and the extrusion line 6 connected to the feedwater pump 33 are disposed upstream of the target portion for air removal (rising portion X). Moreover, as the feedwater pump 33 has a greater discharge capacity than that of the injection pump 31, the air remaining in the rising portion X can be sufficiently removed.

Additionally, in the injection device 1 according to the present embodiment, the feedwater pump 33 disposed on the feedwater line 18 also serves as the first extrusion pump. Thus, an additional pump for air removal is not necessary, and air in the rising portion X can be removed with just a simple modification to an existing system.

In the injection device 1, the makeup pump 32 for supplying cleaning water to the cleaning line 5 also serves as the second extrusion pump. Thus, an additional pump is not necessary, and air in the rising portion X can be removed with just a simple modification to an existing system.

Moreover, in the injection device 1, the injection pump 31 can be cleaned and, by guiding the water used for the cleaning to the rising portion X, the air in the rising portion X can be removed.

Additionally, in the injection device 1 according to the present embodiment, the feedwater line 18 can be provided with just a simple modification to the feedwater line 18 (feedwater system W) of the steam turbine system 100.

An embodiment of the present invention has been described above in detail with reference to the accompanying drawings. However, the configurations described for the embodiment, combinations thereof, and the like are merely examples, and it is possible to make modifications, such as addition, omission, and replacement, to the above-described configuration without departing from the spirit of the present invention.

INDUSTRIAL APPLICABILITY

The injection device described above can be employed in a piping system of a steam turbine system. This injection device can suitably remove the air from inside the piping. Additionally, the properties of water in a feedwater line of a steam turbine system can be maintained in a suitable state.

REFERENCE SIGNS LIST

1 Injection device
2 Supply device
3 Injection line
4 Makeup line
5 Cleaning line
6 Extrusion line
6A A extrusion line
6B B extrusion line
18 Feedwater line
20 First injection valve
21 Second injection valve
22 First cleaning valve
23 First extrusion valve
24 Second extrusion valve
25 Second cleaning valve
26 Makeup valve
31 Injection pump
32 Makeup pump
33 Feedwater pump
41 Chemical tank
42 Makeup tank
51 Steam turbine
52 External device
53 Condenser
61 Boiler
C Connection portion
W Feedwater system
X Rising portion

The invention claimed is:

1. An injection device for injecting injection fluid into piping through which fluid flows, the injection device comprising:
    an injection line through which the injection fluid flows, the injection line being connected to the piping;
    an injection pump disposed on the injection line;
    an extrusion line connected downstream of the injection pump and upstream of a target portion for air removal on the injection line; and
    an extrusion pump for feeding extrusion fluid to the extrusion line, wherein
    a discharge capacity of the extrusion pump is greater than a discharge capacity of the injection pump, and
    the target portion for air removal is a rising portion in a piping of the injection line.

2. The injection device according to claim 1, wherein
    a water pump for feeding fluid is disposed on the piping,
    the extrusion line is connected downstream of the water pump disposed on the piping, and
    the water pump also serves as the extrusion pump.

3. A steam turbine system comprising:
    the injection device according to claim 2;
    a boiler that generates steam;
    a steam turbine that is driven by the steam;
    a condenser that condenses the steam exhausted from the steam turbine to water; and
    a feedwater line for passing the water generated at the condenser to the boiler, wherein the feedwater line is the piping.

4. The injection device according to claim 1, further comprising:
    a cleaning line for passing cleaning fluid to the injection line; and
    a cleaning pump for feeding cleaning fluid to the cleaning line, wherein
    the cleaning line constitutes a portion of the extrusion line and is connected downstream of the injection pump and upstream of the target portion for air removal on the injection line, and
    the cleaning pump also serves as the extrusion pump.

5. A steam turbine system comprising:
    the injection device according to claim 4;
    a boiler that generates steam;
    a steam turbine that is driven by the steam;
    a condenser that condenses the steam exhausted from the steam turbine to water; and
    a feedwater line for passing the water generated at the condenser to the boiler, wherein the feedwater line is the piping.

6. A steam turbine system comprising:
    the injection device according to claim 1;
    a boiler that generates steam;
    a steam turbine that is driven by the steam;

a condenser that condenses the steam exhausted from the steam turbine to water; and a feedwater line for passing the water generated at the condenser to the boiler, wherein the feedwater line is the piping.

* * * * *